Patented Oct. 25, 1938

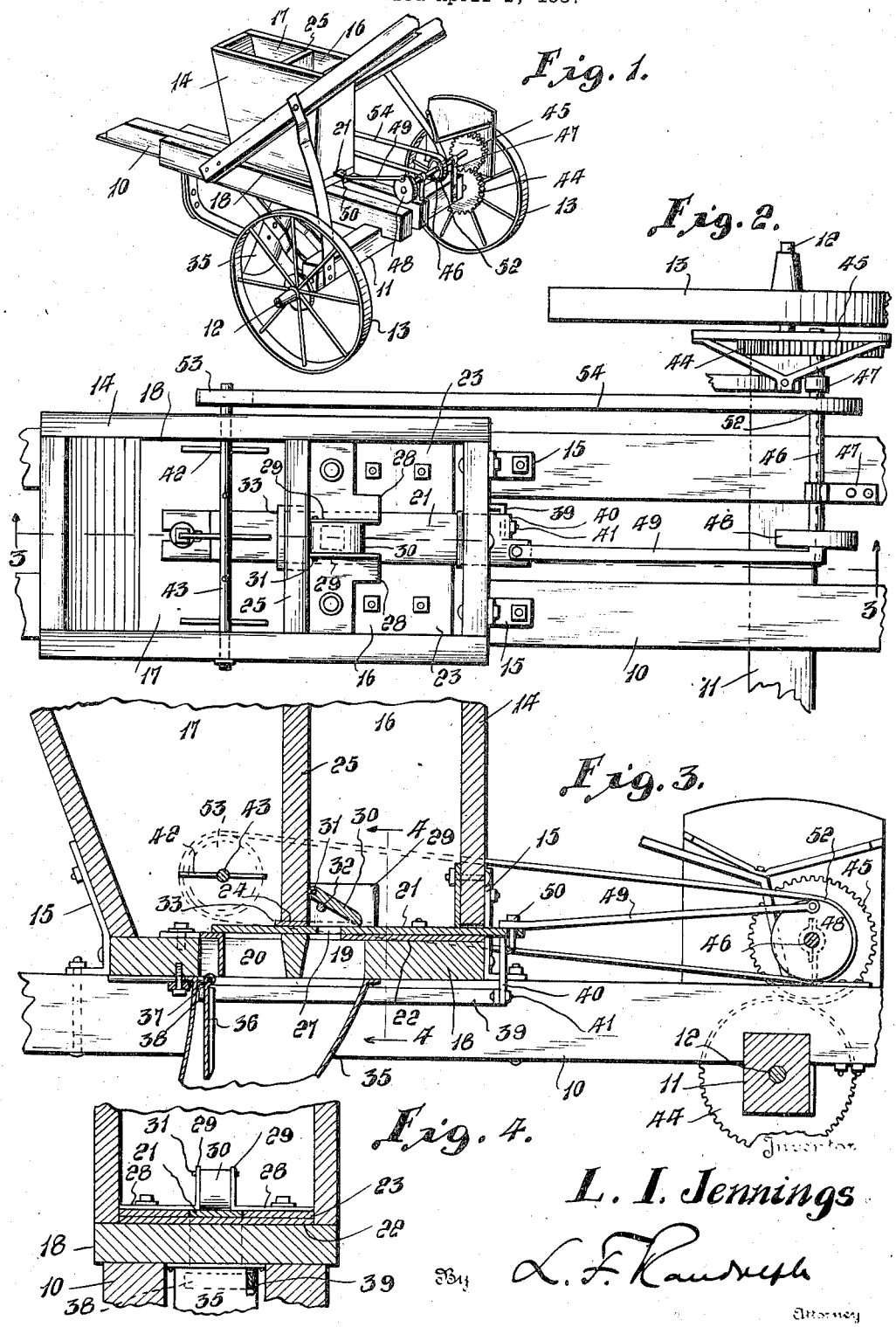

2,134,612

UNITED STATES PATENT OFFICE 2,134,612

CORN PLANTER

Lilburn I. Jennings, Nickelsville, Va.

Application April 1, 1937, Serial No. 134,404

3 Claims. (Cl. 221—122)

This invention relates to a corn planter and it aims to provide a novel construction wherein discharge of a predetermined amount of fertilizer simultaneously with the seed is assured, so as to avoid the waste or discharge of fertilizer.

It also aims to provide novel means whereby the fertilizer is agitated to avoid undue packing thereof.

The more specific objects and advantages will become apparent from a consideration of the description following taken in connection with accompanying drawing illustrating an operative embodiment.

In said drawing—

Figure 1 is a view of the planter in perspective;

Figure 2 is an enlarged partial plan view;

Figure 3 is a vertical sectional view taken on the plane of line 3—3 of Figure 2, and Figure 4 is a vertical sectional detail taken on the line 4—4 of Figure 3.

Referring specifically to the drawing wherein like reference characters designate like or similar parts, the planter consists of a suitable frame 10 to which draft means is hitched in any suitable manner, the frame having a crossbar 11 mounting an axle 12 upon which a pair of ground wheels 13 are journaled.

A suitable hopper 14 is mounted on the frame 10, being secured in place as by means of brackets 15 or the equivalent. Said hopper has compartments 16 and 17, respectively adapted to contain corn or other seed and fertilizer. A bottom wall 18 of the hopper extends across both compartments 16 and 17 and such bottom wall has discharge openings 19 and 20 therethrough, for the seed and fertilizer, respectively, under control of a valve or plate 21. Disposed on the top of the bottom plate 18, with the openings 19 and 20 also extending through it, is a wear plate 22 and disposed thereon in laterally spaced relation are auxiliary wear plates 23. The valve 21 is disposed between the wear plates 23, being preferably of metal like the wear plates 22 and 23, and which plate 21 is reciprocable in longitudinal direction, extending through an opening 24 in the partition 25 which divides the chambers 16 and 17. Valve 21 also has a seed discharge opening or port 27 therethrough.

A pair of brackets 28 are fastened over the auxiliary wear plates 23 and they have vertical flanges 29 in laterally spaced relation to and between which a flap 30 is pivoted at 31, normally resting on a stop 32 bridging such flanges. Brackets 28 also have extensions 33 which are disposed in the opening 24 to protect the partition 25 against undue wear due to the reciprocation of the valve 21.

Depending from the bottom wall 18 is a discharge tube 35 in communication with both the openings or slots 19 and 20. At times the opening or slot 20 is closed by a gate 36 pivoted at 37 to the wall 18. At times the gate 36 closes the slot 20 due to the fact that a lug 38 on a reciprocable arm 39, engages the same from below. Said arm 39 is preferably rigidly connected with the valve 21, specifically to a forward extension 40, at 41. In the rearmost position of the lug 38, it disengages the gate 36 so that the latter may fall to a vertical position.

An agitator 42 of any desired construction, is disposed within the chamber or compartment 17, so as to prevent undue packing of the fertilizer. Such agitator has a shaft 43 journaled in the walls of the hopper 14 and extending to the exterior thereof.

The power for operating the valve plate 21 and the agitator 42 is derived from the aforesaid axle 12 to which end it has a gear wheel 44 keyed thereto and enmeshed with a gear wheel 45 keyed to a transverse shaft 46 mounted in suitable bearings 47 on the frame 10. An eccentric or disk 48 is fixed on one end of shaft 46 and a pitman 49 is eccentrically connected to it and loosely connected at 50 to the valve 21. In addition, a pulley 52 is keyed to shaft 46 and a pulley 53 is keyed to shaft 43. Said pulleys 52 and 53 are preferably covered with rubber to increase the friction at their peripheries over which a belt 54 is trained.

In the operation of the device, considering the valve 21 in its forward position, the fertilizer from chamber 17 falls through opening 20 onto the gate 36 and at the same time a seed from the supply in chamber 16 enters opening 27, resting on the plate 22 therebeneath. On the rearward movement of the valve 21, it will close the opening 20 and dispose the opening 27 with the seed therein beneath the flap 30. At the time plate 21 closes opening 20 and opening 27 registers with opening or slot 19, the lug 37 disengages the gate 36 so that the latter falls to the vertical position of Figure 3, simultaneously discharging the seed and fertilizer through the slots 19 and 20 into the tube or chute 35 from which they fall into the desired hill, furrow or the like. During such operation, the agitator 42 continues to rotate through the gearing previously traced.

Various changes may be resorted to provided they fall within the spirit and scope of the invention.

I claim as my invention:

1. A distributor of the class described comprising a hopper having seed and fertilizer chambers, a bottom wall for the hopper having slots therethrough communicating one with each chamber, a valve slidable over said bottom wall to cut-off the slot from the fertilizer chamber, said valve having an opening to convey seed to the other slot, baffle means in the seed chamber disposed over the valve at the position of discharge of the opening thereof, a gate beneath the slot for the fertilizer, and means movable with the valve to control the opening and closing of said gate.

2. A distributor of the class described comprising a hopper having seed and fertilizer chambers, a bottom wall for the hopper having slots therethrough communicating one with each chamber, a valve slidable over said bottom wall to cut-off the slot from the fertilizer chamber, said valve having an opening to convey seed to the other slot, baffle means in the seed chamber disposed over the valve at the position of discharge of the opening thereof, a gate beneath the slot for the fertilizer, means movable with the valve to control the opening and closing of said gate, consisting of an arm and a lug extending laterally from the arm engageable and disengageable with the lower surface of the gate.

3. A distributor of the class described comprising a hopper having seed and fertilizer chambers, a bottom wall for the hopper having slots therethrough communicating one with each chamber, a valve slidable over said bottom wall to cut-off the slot from the fertilizer chamber, said valve having an opening to convey seed to the other slot, baffle means in the seed chamber disposed over the valve at the position of discharge of the opening thereof, a gate beneath the slot for the fertilizer, means movable with the valve to control the opening and closing of said gate, a wear plate on the bottom plate, auxiliary wear plates on the bottom plate, and said valve being disposed on the first mentioned wear plate between the auxiliary wear plates.

LILBURN I. JENNINGS.